United States Patent [19]

Boggiano

[11] Patent Number: 4,621,572
[45] Date of Patent: Nov. 11, 1986

[54] APPARATUS FOR PROCESSING FAVA BEANS HAVING PODS AND SEEDS

[76] Inventor: John Boggiano, 7899 DeMartini La., Linden, Calif. 95236

[21] Appl. No.: 725,004

[22] Filed: Apr. 19, 1985

[51] Int. Cl.[4] .............................................. A23N 5/00
[52] U.S. Cl. ...................................... 99/574; 99/576; 99/582; 426/482
[58] Field of Search ................... 426/482, 481; 99/576, 99/574, 541, 593, 581, 582

[56] References Cited

U.S. PATENT DOCUMENTS 1,342,691 6/1920 Pape ...................................... 426/482
2,248,327 7/1941 Bainer et al. .......................... 99/576
2,344,711 3/1944 McNutt et al. ........................ 99/582

Primary Examiner—George Yeung
Attorney, Agent, or Firm—Phillips, Moore, Lempio & Finley

[57] ABSTRACT

The pods or husks of fava beans are pierced by a plurality of cutting wheels whereafter the beans are compressed to separate the pods from the seeds of the beans. The beans are fed into a stationary trough which defines an elongated bed supporting the beans and a moveable conveyor belt overlies the bed to frictionally engage and move the beans therealong. The peripheries of the cutting wheels project upwardly through slots formed through the trough to effect the piercing function.

9 Claims, 3 Drawing Figures

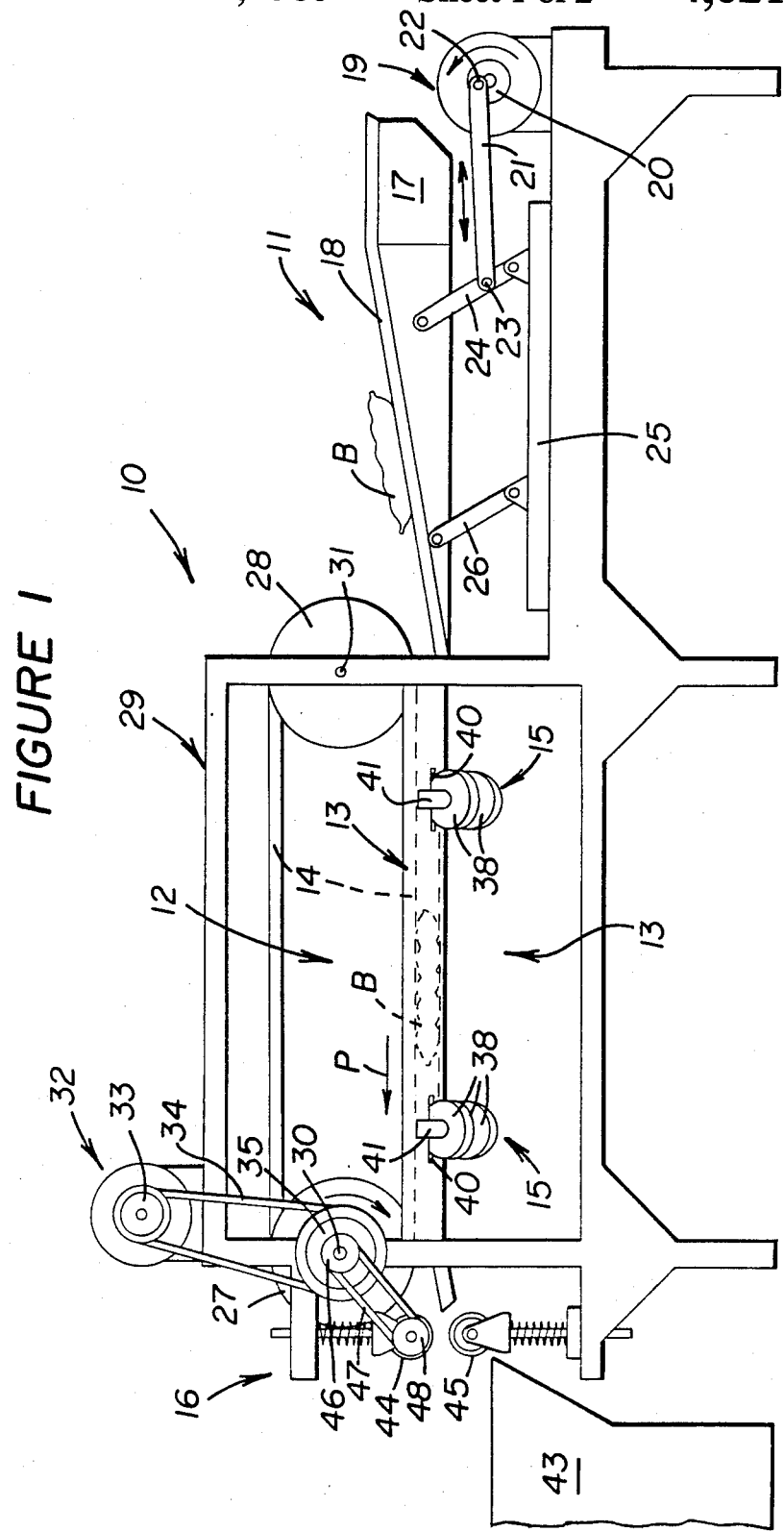

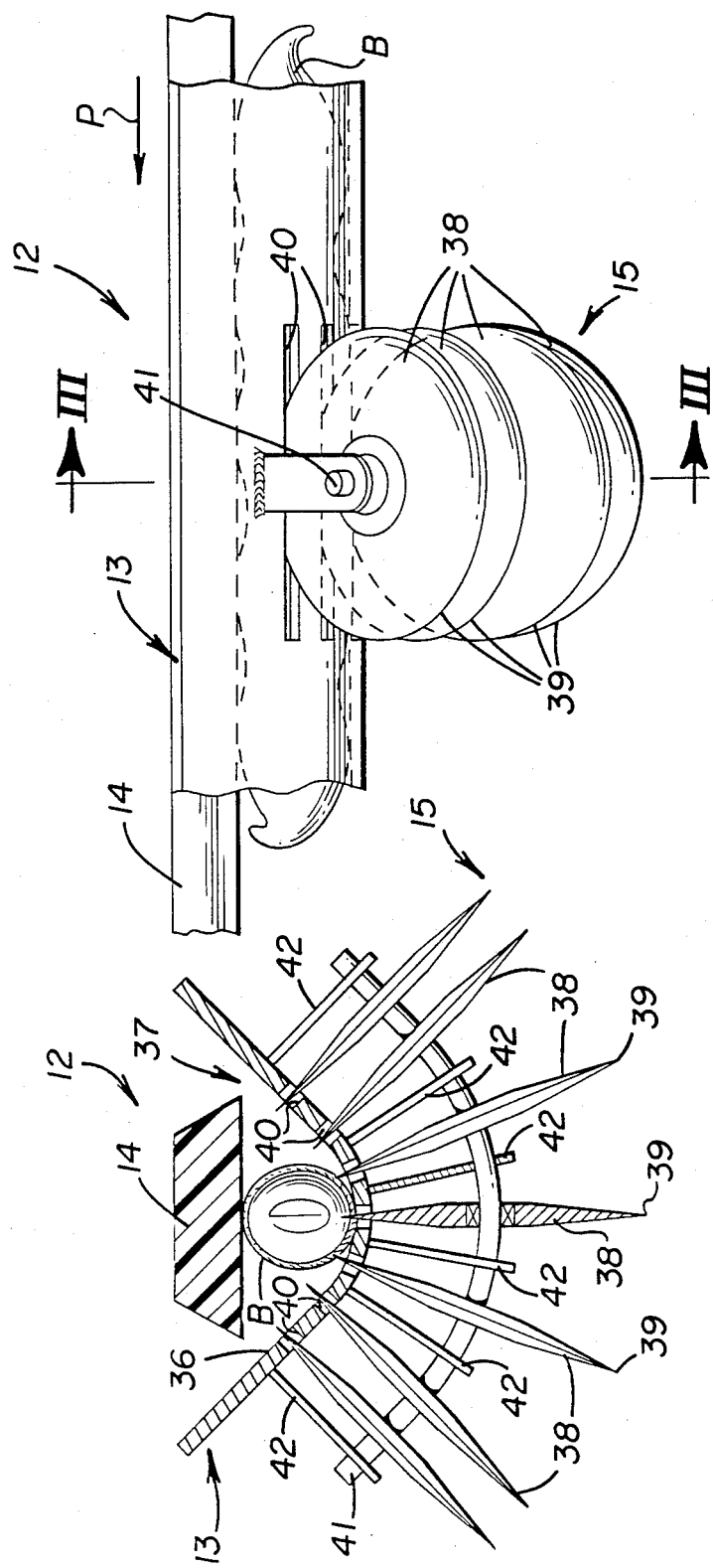

APPARATUS FOR PROCESSING FAVA BEANS HAVING PODS AND SEEDS

DESCRIPTION

Technical Field

This invention relates generally to an apparatus and method for processing beans or the like and more particularly to the piercing of the pods of fava beans to facilitate separation of the pods from the seeds thereof.

Background Art

The commercial marketability of various types of podded beans largely depends on the ability to expeditiously and economically separate the pods from the seeds thereof. The inability to provide an apparatus and method for efficiently effecting such separation is particularly apparent in respect to fava beans which have a relatively tough pod. In conventional practice, the pods are manually removed by the use of knives or the like which is time-consuming and gives rise to uneconomically high processing costs.

Disclosure of Invention

The apparatus and method of the present invention overcomes the above, briefly described problems by insuring that the pods of fava beans or the like can be separated from the seeds thereof expeditiously, efficiently and economically with the use of minimal labor and without damaging the seeds.

In its broadest aspect, the apparatus comprises first means for moving the beans along a path and second means for piercing the pods of the beans during their movement along the path to facilitate the separation of the pods from the seeds of the beans.

In the preferred embodiment of this invention, the first means includes a stationary trough having an endless conveyor disposed in overlying relationship therewith to frictionally engage and move the beans and the second means comprises a plurality of rotary cutting wheels projecting through slots formed in the trough to pierce the pods of the beans.

BRIEF DESCRIPTION OF THE DRAWINGS

Other objects and advantages of this invention will become apparent from the following description and accompanying drawings wherein:

FIG. 1 is a side elevational view of an apparatus for processing fava beans;

FIG. 2 is an enlarged side elevational view of a cutting wheel assembly mounted in the apparatus to pierce the pods of the fava beans; and FIG. 3 is a sectional view through the cutting wheel assembly, taken in the direction of arrows III—III in FIG. 2.

BEST MODE OF CARRYING OUT THE INVENTION

General Description

FIG. 1 illustrates an apparatus 10 for processing fava beans or the like comprising an infeed station 11 for delivering fave beans B to an upstream end of a conveying and slicing station 12. Station 12 comprises a horizontally disposed stationary trough 13 supporting the beans thereon and an overlying endless conveyor belt 14 for frictionally engaging the tops of the beans to move them in the direction of path P in the trough. A pair of longitudinally spaced and identical cutting wheel assemblies 15 are mounted below trough 13 to have the cutting of blades thereof project upwardly through the trough to pierce the pods of beans B.

As described above, the fava bean, in particular, has a relatively tough pod or husk that must be cut or pierced before the pods can be separated from the seeds of the beans. Applicant's apparatus and method effects such separation expeditiously, efficiently and economically. After the pods of the beans have been pierced by the slicing action of cutting wheel assemblies 15, conveyor belt 14 continues to move the beans to a separation station 16, located at a downstream end of station 12, that functions to receive and compress the beans to separate the pods from the seeds thereof.

Detailed Description

Referring to FIG. 1, infeed station 11 may comprise a hopper 17 adapted to retain the field-harvested fava beans therein and a conventional shaker table or chute 18 aligned with an upstream end of trough 13. Chute 18 slopes downwardly from the upper open end of hopper 17 to the upstream end of trough 13 and is adapted to intermittently reciprocate generally in the direction of path P to shake beans B downwardly into the trough. In the embodiment schamatically illustrated in FIG. 1, a means for intermittently reciprocating chute 18 is shown in the form of an electrical drive motor 19 having its output shaft suitably secured to an eccentric 20.

A link 21 has a first end thereof pivotally connected at 22 in offset relationship relative to the rotational axis of eccentric 20 and its second end pivoted at 23 to a second link 24. Link 24 is pivotally interconnected between chute 18 and a stationary base 25, along with a third link 26. Thus, chute 18, links 24 and 26 and base 25 form a parallelogram type linkage for reciprocating the chute upon rotation of eccentric 20.

When the beans enter conveying and slicing station 12, they are frictionally engaged by overlying belt 14. The belt can be composed of a standard fabric or cord (nylon or steel) suitably impregnated and bound together by vulcanized rubber compounds. Endless conveyor belt 14 is mounted in a conventional manner on a drive pulley 27 and an idler pulley 28.

Pulleys 27 and 28 are rotatably mounted on a stationary frame 29 of apparatus 10 by horizontally disposed shafts 30 and 31, respectively. Pulley 27 is sequentially driven by an electrical drive motor 32, a drive pulley 33 secured to the output shaft of the motor, a drive belt 34 and a driven pulley 35 secured on shaft 30 along with pulley 27. If so desired, standard adjustment means (not shown) can be utilized to vertically adjust the position of each shaft 30 and 31 on the frame to closely control the separation distance between belt 14 and trough 13 to ensure firm frictional engagement of the belt with beans B during the processing operation.

As shown in FIGS. 1-3 trough 13 is suitably secured on frame 29 and defines a horizontally disposed and elongated bed 36 extending along path P in underlying relationship relative to belt 14. The trough and the concavity defined by the bed have generally U-shaped cross-sections to aide in retaining the beans therein. As further shown in FIG. 3, suitably sized clearances 37 are provided between each lateral side of the belt and bed 36 to prevent frictional engagement therebetween, and to prevent the beans from egressing through the clearance. The bed can be horizontally disposed, as shown in FIG. 1, or tilted slightly downwardly from infeed station 11 to separation station 16 whereby gravity will aid the belt in moving the beans through station 12.

As further shown in FIGS. 2 and 3, each cutting wheel assembly 15 comprises a plurality of rotary cutting wheels 38. Each cutting wheel has a very sharp circular cutting edge 39 formed on the periphery thereof. The cutting edge of each wheel 38 projects through a respective slot 40, formed through trough 13 to extend longitudinally in the direction of path P.

Any desired number of laterally spaced cutting wheels and slots may be employed so long as the pod of the bean is sufficiently pierced or sliced to facilitate expeditious and easy removal of the bean seeds at separation station 16. As further shown in FIG. 3, cutting wheels 38 are preferably rotatably mounted on a common shaft 41, disposed transversly relative to path P and conveyor belt 14. The shaft is also generally U-shaped to at least generally conform to the shape of trough 13 and bed 36 and may be secured to the trough to hold its shape by a plurality of struts 42.

The shaft may be formed from a rolled (coil) spring steel stock adapted to be bent and shaped, as shown. The cutting wheels are rotatably mounted on the bent shaft to orientate the cutting wheels to face and converge generally towards path P and belt 14. When the cutting wheels are initially mounted on the shaft, the shaft assumes a straight-line (relaxed) configuration.

After the beans have been processed through conveying and slicing station 12 to adequately pierce and slice the pods thereof, the beans are conveyed into separation station 16 whereat the pods are removed from the bean seeds and deposited into a bin 43. As illustrated in FIG. 1, the separation station may comprise a pair of vertically (or horizontally) disposed squeeze rollers 44 and 45 which function to receive and compress the beans to separate the pods from the seeds.

The rollers may each comprise an elastomeric outer covering, similar to that used for conventional washing machine wringers. The rollers may be spring-loaded in a conventional manner to maintain the desired separation space therebetween. Roller 44, for example, is adapted to be driven by pulley 35 via a takeoff pulley 46 secured to shaft 30, a belt 47 and a pulley 48 secured to roller 43.

I claim:

1. An apparatus for processing fava beans having pods and seeds comprising
    first means for supporting and moving said beans along a path, and
    second means for cutting the pods of said beans during their movements along said path to facilitate separation of said pods from the seeds of said beans,
    said first means comprising a horizontally disposed stationary trough defining an elongated bed thereon extending in the direction of said path and adapted to support said beans thereon and a moveable conveyor means extending in the direction of said path in overlying relationship relative to said bed for engaging and moving said beans along said path.

2. The apparatus of claim 1 wherein said conveyor means comprises an endless belt means for frictionally engaging said beans.

3. The apparatus of claim 1 wherein said bed has a generally U-shaped cross-section throughout the length thereof.

4. The apparatus of claim 1 further comprising a plurality of laterally spaced slots formed through said trough and extending in the direction of said path and wherein said second means comprises a plurality of rotary cutting wheels each having a circular cutting edge thereof extending through a respective one of said slots and further extending above said bed.

5. The apparatus of claim 4 wherein said cutting wheels are rotatably mounted on a common shaft disposed transversly relative to said path.

6. The apparatus of claim 5 wherein said trough has a generally U-shaped cross-section and wherein said shaft is generally U-shaped to at least generally conform to the shape of said trough.

7. The apparatus of claim 1 further comprising infeed means aligned with an upstream end of said trough for delivering said beans to the bed thereof.

8. The apparatus of claim 7 wherein said infeed means comprises a chute aligned with the upstream end of said trough and drive means connected to said chute for intermittently reciprocating said chute to shake said beans in the direction of said path.

9. The apparatus of claim 1 further comprising means aligned with a downstream end of said trough for receiving and compressing said beans to separate said pods from said seeds.

* * * * *